(12) United States Patent
Morimoto et al.

(10) Patent No.: US 11,756,181 B2
(45) Date of Patent: Sep. 12, 2023

(54) METHOD FOR PERFORMING IMAGE PROCESSING FOR DETERMINING IMAGE DEFECT IN MIXED-COLOR TEST IMAGE THROUGH IMAGE READING

(71) Applicant: KYOCERA Document Solutions Inc., Osaka (JP)

(72) Inventors: Kanako Morimoto, Osaka (JP); Kazunori Tanaka, Osaka (JP); Koji Sato, Osaka (JP); Takuya Miyamoto, Osaka (JP); Rui Hamabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 136 days.

(21) Appl. No.: 17/558,496

(22) Filed: Dec. 21, 2021

(65) Prior Publication Data
US 2022/0207705 A1    Jun. 30, 2022

(30) Foreign Application Priority Data
Dec. 24, 2020  (JP) ................................. 2020-214843

(51) Int. Cl.
*G06T 7/00*       (2017.01)
*G06K 15/02*     (2006.01)

(52) U.S. Cl.
CPC .......... *G06T 7/0004* (2013.01); *G06K 15/027* (2013.01); *G06T 2207/10024* (2013.01); *G06T 2207/30144* (2013.01)

(58) Field of Classification Search
CPC ......... G06T 7/0004; G06T 2207/10024; G06T 2207/30144; G06K 15/027
USPC ......................................................... 382/112
See application file for complete search history.

(56) References Cited

U.S. PATENT DOCUMENTS 11,201,970 B2 *  12/2021  Nishizawa ......... H04N 1/00068
2012/0128378 A1 *  5/2012  Izumiya ............. G03G 15/5041
                                                            399/26
2022/0207701 A1 *  6/2022  Morimoto ............ G06V 10/774

FOREIGN PATENT DOCUMENTS

JP           2017083544 A       5/2017

* cited by examiner

*Primary Examiner* — Gabriel I Garcia
(74) *Attorney, Agent, or Firm* — Alleman Hall Creasman & Tuttle LLP

(57) ABSTRACT

A processor determines an image defect in a test image obtained through an image reading process performed on an output sheet output by an image forming apparatus. The processor derives a vertical data string that is composed of data about horizontal representative values serving as representative values of a plurality of pixel values in each line in a horizontal direction in the test image. Moreover, the processor determines the presence or absence of at least one periodicity set in advance in the vertical data string by performing frequency analysis on the vertical data string. Furthermore, the processor determines the occurrence or non-occurrence and the cause of periodic density unevenness serving as a type of the image defect according to the determination result on the periodicity.

6 Claims, 8 Drawing Sheets

METHOD FOR PERFORMING IMAGE
PROCESSING FOR DETERMINING IMAGE
DEFECT IN MIXED-COLOR TEST IMAGE
THROUGH IMAGE READING

INCORPORATION BY REFERENCE

This application is based upon and claims the benefit of priority from the corresponding Japanese Patent Application No. 2020-214843 filed on Dec. 24, 2020, the entire contents of which are incorporated herein by reference.

BACKGROUND

The present disclosure relates to an image processing method and an image processing apparatus for determining the cause of image defects on the basis of a test image.

An image forming apparatus such as a printer or a multifunction peripheral executes a print process of forming images on sheets. During the print process, image defects such as vertical lines, horizontal lines, spots, and density unevenness may occur in the images formed on output sheets.

For example, in a case where the image forming apparatus executes the print process by an electrophotographic method, the image defects can be caused by various portions including photoconductors, charging portions, developing portions, and transfer portions. The determination of the cause of the image defects requires skill and experience.

In a known image processing apparatus, the cause of vertical lines serving as an example of the image defects and feature information including the color, density, or number of screen lines of the vertical lines are associated with each other in advance in table data to identify the cause of the vertical lines on the basis of the table data and the information about the color, density, or number of screen lines of the vertical lines in a test image.

The table data includes the range of the parameter such as the color, density, or number of screen lines of the images set as a threshold for each type of cause of the vertical lines.

SUMMARY

An image processing method according to an aspect of the present disclosure is a method performed by a processor for determining an image defect in a test image obtained through an image reading process performed on an output sheet output by an image forming apparatus. The image processing method includes deriving, by the processor, a vertical data string that is composed of data about horizontal representative values serving as representative values of a plurality of pixel values in each line in a horizontal direction in the test image. The image processing method further includes determining, by the processor, presence or absence of at least one periodicity set in advance in the vertical data string by performing frequency analysis on the vertical data string. The image processing method further includes determining, by the processor, occurrence or non-occurrence and cause of periodic density unevenness serving as a type of the image defect according to a determination result on the periodicity.

An image processing apparatus according to another aspect of the present disclosure includes a processor that executes processes of the image processing method.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Processing Apparatus 10]

An image processing apparatus 10 according to the embodiment includes an image forming apparatus 2 that executes a print process. The print process is a process of forming images on sheets. The sheets are image formation media such as sheets of paper or sheet-like resin members.

The image processing apparatus 10 further includes an image reading apparatus 1 that executes a reading process of reading images from document sheets. For example, the image processing apparatus 10 is a copier, a facsimile apparatus, a multifunction peripheral, or the like.

Images subjected to the print process are those read from the document sheets by the image reading apparatus 1 or those represented by print data received from a host device (not shown). The host device is an information processing apparatus such as a personal computer, a personal digital assistant, or the like.

Figure 6:
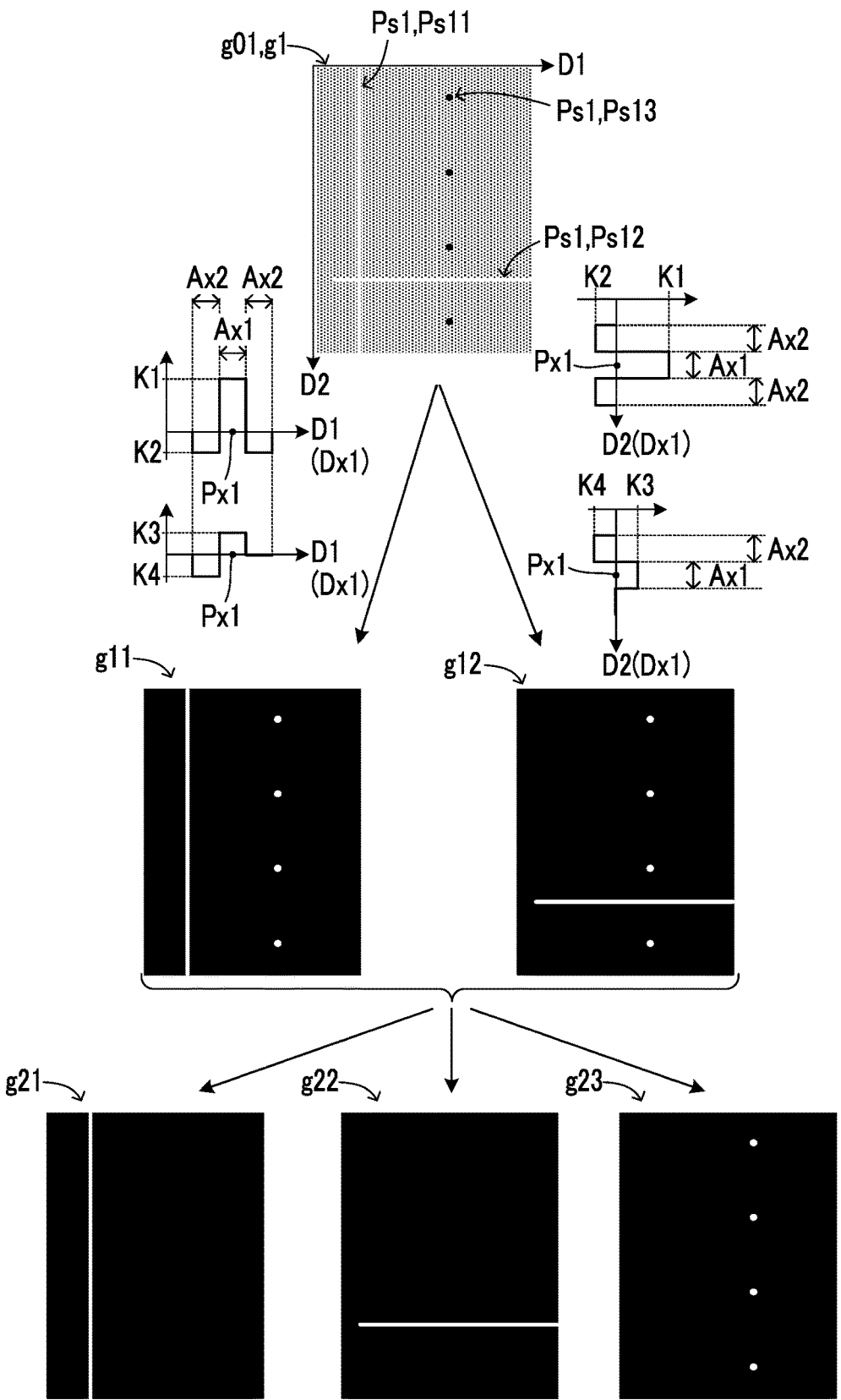
FIG. 6 shows an example of a test image including singular portions and examples of preprocessed images and feature images created on the basis of the test image.

Furthermore, the image forming apparatus 2 may form an original test image g01 set in advance by the print process on the sheets (see FIG. 6). The original test image g01 is an original image of a test image g1 used to determine the presence or absence and the cause of image defects in the image forming apparatus 2 (see FIG. 6). The test image g1 will be described later.

A copy process includes the reading process by the image reading apparatus 1 and the print process by the image forming apparatus 2 based on images obtained by the reading process.

Figure 1:
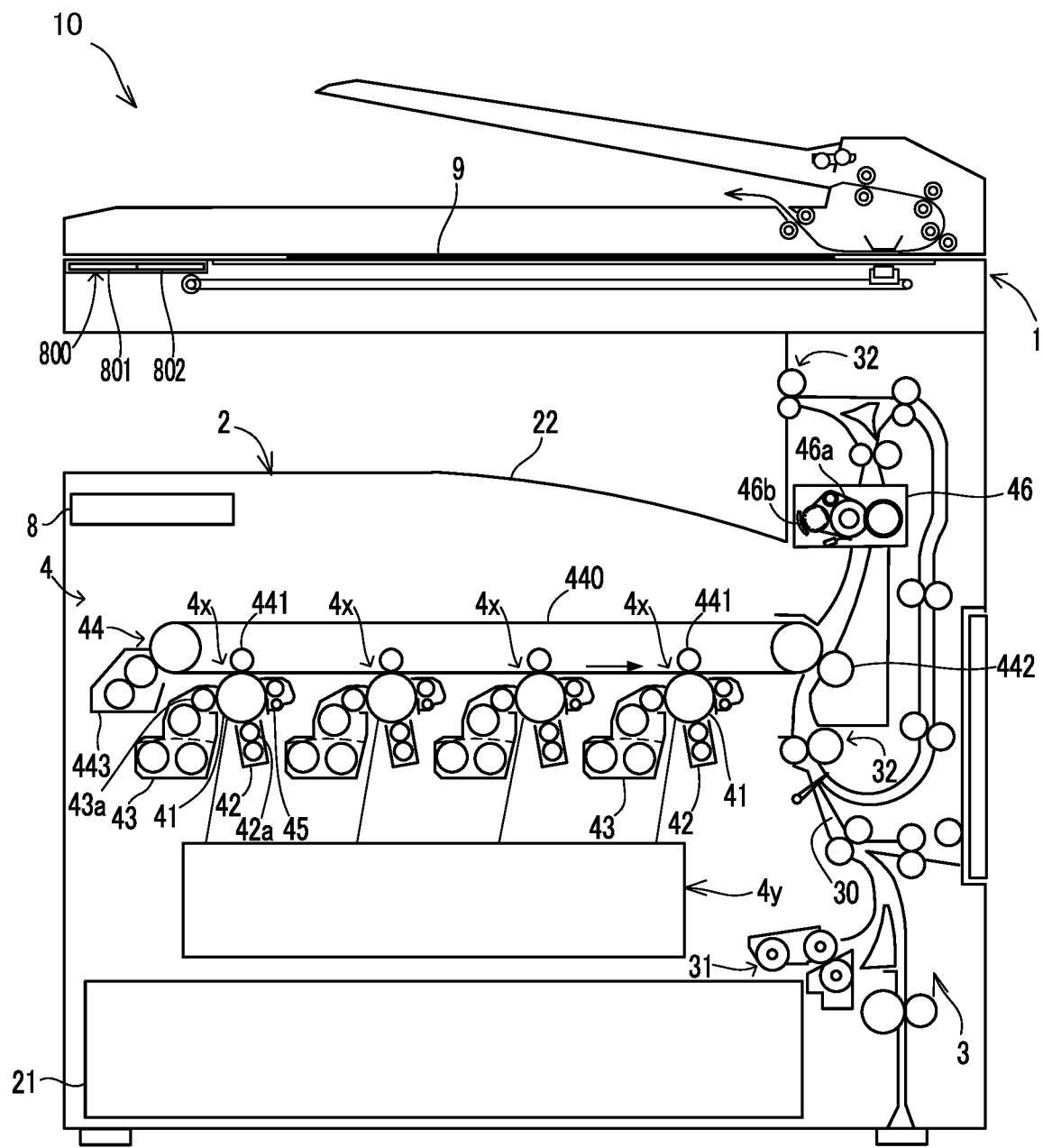
FIG. 1 is a configuration diagram of an image processing apparatus according to an embodiment.

As shown in FIG. 1, the image forming apparatus 2 includes a sheet conveying mechanism 3 and a print portion 4. The sheet conveying mechanism 3 includes a sheet feed mechanism 31 and pairs of sheet conveying rollers 32.

The sheet feed mechanism 31 feeds the sheets from a sheet storing portion 21 to a sheet conveyance path 30. The pairs of sheet conveying rollers 32 convey the sheets along the sheet conveyance path 30 and discharge the sheets with images formed thereon to an output tray 22.

The print portion 4 executes the print process on the sheets conveyed by the sheet conveying mechanism 3. In the present embodiment, the print portion 4 executes the print process by an electrophotographic method.

The print portion 4 includes imaging portions 4x, a laser scanning unit 4y, a transfer device 44, and a fixing device 46. The imaging portions 4x each include a drum-like photoconductor 41, a charging device 42, a developing device 43, and a drum cleaning device 45.

In each of the imaging portions 4x, the photoconductor 41 rotates, and the charging device 42 electrically charges the surface of the photoconductor 41 uniformly. The charging device 42 includes a charging roller 42a that rotates while being in contact with the surface of the photoconductor 41. The charging roller 42a to which a charging voltage is applied electrically charges the surface of the photoconductor 41.

The laser scanning unit 4y scans laser beams to draw electrostatic latent images on the charged surfaces of the photoconductors 41. This forms the electrostatic latent images on the surfaces of the photoconductors 41.

The developing devices 43 develop the electrostatic latent images as toner images. The developing devices 43 each include a developing roller 43a that supplies toner to the corresponding photoconductor 41 to develop the electrostatic latent images as the toner images. The transfer device 44 transfers the toner images from the surfaces of the photoconductors 41 to the sheets. It is noted that the toner is an example of a particulate developer.

The fixing device 46 fixes the toner images on the sheets to the sheets by heating the toner images. The fixing device 46 includes a fixing rotor 46a brought into contact with the sheets to rotate and a fixing heater 46b that heats the fixing rotor 46a.

The image forming apparatus 2 shown in FIG. 1 is a color printing apparatus of a tandem type and can execute the print process to form color images. To do this, the print portion 4 includes the four imaging portions 4x that respectively correspond to toner of different colors.

In addition, the transfer device 44 in the image forming apparatus 2 of the tandem type includes four primary transfer rollers 441 that respectively correspond to the four photoconductors 41, an intermediate transfer belt 440, a secondary transfer roller 442, and a belt cleaning device 443.

The four imaging portions 4x each form the toner images of cyan, magenta, yellow, or black on the surface of the corresponding photoconductor 41. Each of the primary transfer rollers 441 is also part of the corresponding imaging portion 4x.

In each of the imaging portions 4x, the primary transfer roller 441 biases the intermediate transfer belt 440 toward the surface of the photoconductor 41 while rotating. The primary transfer roller 441 transfers the toner images from the photoconductor 41 to the intermediate transfer belt 440. This forms color images composed of the toner images of the four colors on the intermediate transfer belt 440.

In each of the imaging portions 4x, the drum cleaning device 45 removes and collects the toner, remaining on the photoconductor 41 without being transferred to the intermediate transfer belt 440, from the photoconductor 41.

The secondary transfer roller 442 transfers the toner images of the four colors on the intermediate transfer belt 440 to the sheets. It is noted that, in the image processing apparatus 10, the photoconductors 41 and the intermediate transfer belt 440 of the transfer device 44 are examples of an image-carrying member that rotates while carrying the toner images.

The belt cleaning device 443 removes and collects the toner, remaining on the intermediate transfer belt 440 without being transferred to the sheets, from the intermediate transfer belt 440.

As shown in FIG. 1, the image processing apparatus 10 includes a data processing portion 8 and a human interface device 800 in addition to the image forming apparatus 2 and the image reading apparatus 1. The human interface device 800 includes an operation portion 801 and a display portion 802.

The data processing portion 8 executes various types of data processing regarding the print process or the reading process and, in addition, controls various types of electrical devices.

The operation portion 801 is a device that receives operations from users. For example, the operation portion 801 includes either push buttons or a touch panel, or both. The display portion 802 includes a display panel that displays information to be provided for the users.

Figure 2:
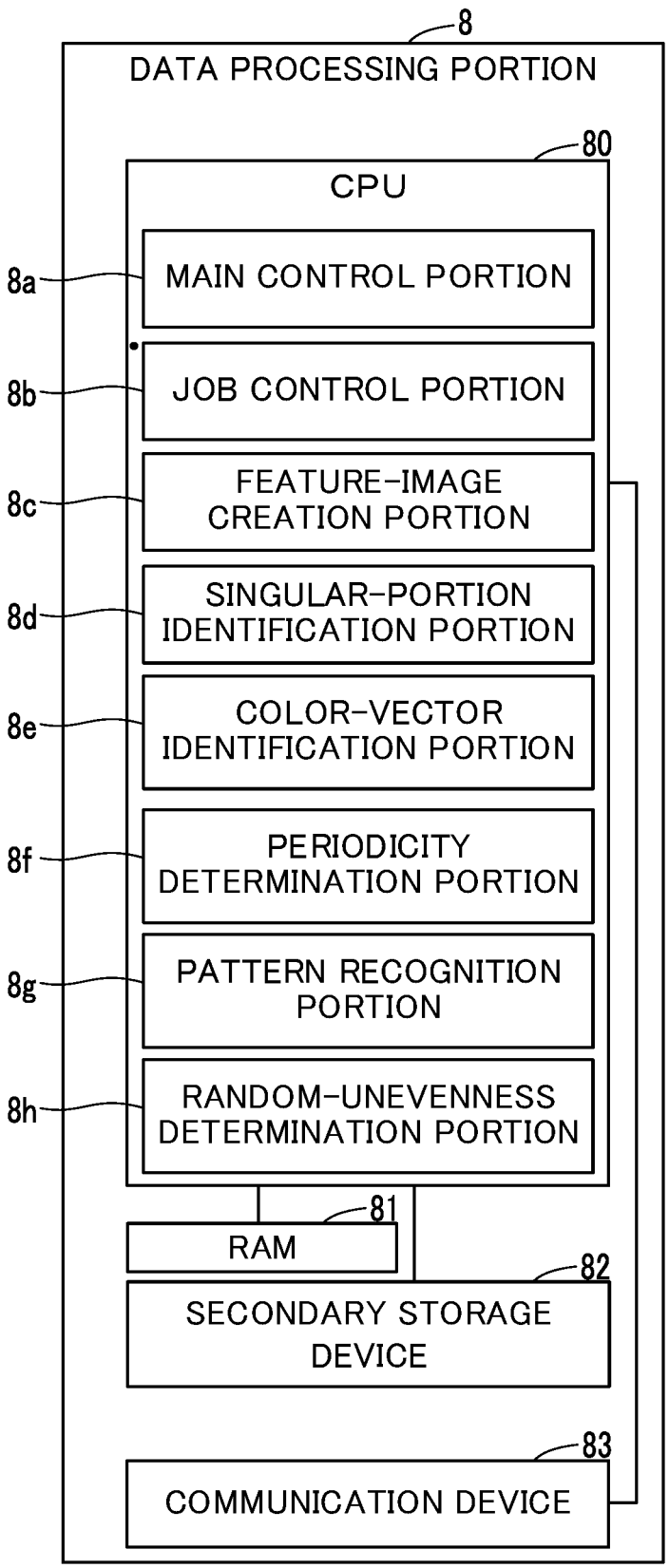
FIG. 2 is a block diagram showing a configuration of a data processing portion in the image processing apparatus according to the embodiment.

As shown in FIG. 2, the data processing portion 8 includes a CPU (Central Processing Unit) 80, a RAM (Random Access Memory) 81, a secondary storage device 82, and a communication device 83.

The CPU 80 can process data received by the communication device 83, execute various types of image processing, and control the image forming apparatus 2. The received data may include the print data. The CPU 80 is an example of a processor that executes data processing including the image processing. It is noted that the CPU 80 may be implemented by a processor of other types such as a DSP (Digital Signal Processor).

The communication device 83 is a communication interface device that communicates with other devices such as the host device through networks such as a LAN (Local Area Network). The CPU 80 performs all transmission and reception of data to and from the other devices through the communication device 83.

The secondary storage device 82 is a computer-readable nonvolatile storage device. The secondary storage device 82 stores various types of data consulted by the CPU 80 and computer programs executed by the CPU 80. For example, either a flash memory or a hard disk drive, or both, is adopted as the secondary storage device 82.

The RAM 81 is a computer-readable volatile storage device. The RAM 81 primarily stores the computer programs executed by the CPU 80 and data that is output or consulted by the CPU 80 during execution of the programs.

The CPU 80 includes a plurality of processing modules that are implemented when the computer programs are executed. The plurality of processing modules include a main control portion 8*a* and a job control portion 8*b*. It is noted that part or all of the plurality of processing modules may be implemented by other processors such as DSPs separate from the CPU 80.

The main control portion 8*a* executes processes of, for example, selecting jobs according to the operations on the operation portion 801, displaying information in the display portion 802, and setting various types of data. Furthermore, the main control portion 8*a* executes a process of determining the contents of the data received by the communication device 83.

The job control portion 8*b* controls the image reading apparatus 1 and the image forming apparatus 2. For example, when the data received by the communication device 83 includes the print data, the job control portion 8*b* causes the image forming apparatus 2 to execute the print process based on the received data.

In addition, when the main control portion 8*a* detects a copy request operation performed on the operation portion 801, the job control portion 8*b* causes the image reading apparatus 1 to execute the reading process and causes the image forming apparatus 2 to execute the print process based on the images obtained in the reading process.

Figure 8:
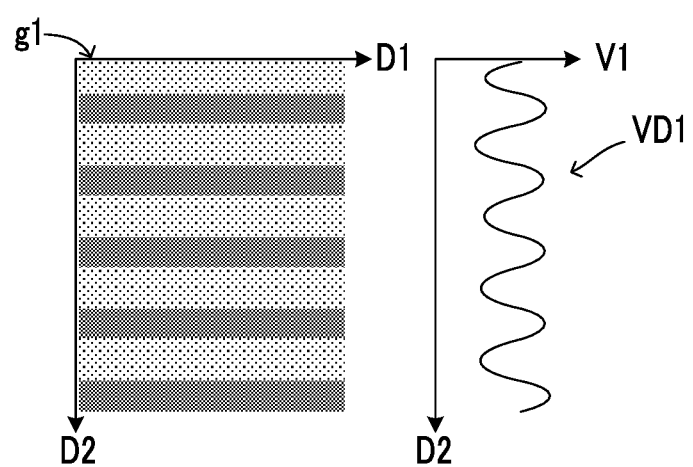
FIG. 8 shows an example of a test image including periodic density unevenness and vertical waveform data derived from the test image.

During the print process, image defects such as vertical lines Ps11, horizontal lines Ps12, spots Ps13, and density unevenness may occur in the images formed on output sheets (see FIGS. 6 and 8).

As described above, the image forming apparatus 2 executes the print process by the electrophotographic method. In this case, image defects can be caused by various portions including the photoconductors 41, the charging devices 42, the developing devices 43, and the transfer device 44. The determination of the cause of the image defects requires skill and experience.

In the present embodiment, the image forming apparatus 2 executes a test print process of forming the predetermined original test image g01 on a sheet.

For example, when the main control portion 8*a* detects a test output operation performed on the operation portion 801, the job control portion 8*b* causes the image forming apparatus 2 to execute the test print process. In the description below, the sheet on which the original test image g01 is formed will be referred to as "test output sheet 9" (see FIG. 1).

Furthermore, when the test print process is executed, the main control portion 8*a* causes the display portion 802 to display a predetermined guide message. The guide message prompts the users to place the test output sheet 9 on the image reading apparatus 1 and then perform a reading start operation on the operation portion 801.

When the main control portion 8*a* detects the reading start operation performed on the operation portion 801 after the guide message is displayed in the display portion 802, the job control portion 8*b* causes the image reading apparatus 1 to execute the reading process. Thus, the image reading apparatus 1 reads the original test image g01 from the test output sheet 9 output by the image forming apparatus 2 and obtains a read image corresponding to the original test image g01.

As described later, the CPU 80 executes a process of determining the presence or absence and the cause of the image defects on the basis of the read image or the test image g1 serving as an image obtained by compressing the read image (see FIG. 6). The CPU 80 is an example of a processor that executes processes of an image processing method for determining the presence or absence and the cause of the image defects.

The apparatus that reads the original test image g01 from the test output sheet 9 may be, for example, a digital camera. It is noted that the process of reading the original test image g01 from the test output sheet 9 by the image reading apparatus 1 or the digital camera is an example of an image reading process performed on the test output sheet 9.

The density unevenness serving as a type of the image defects may be caused by improper rotation of a plurality of rotating bodies in the imaging portions 4*x* of the image forming apparatus 2. The plurality of rotating bodies include the photoconductors 41, the charging rollers 42*a*, the developing rollers 43*a*, and the primary transfer rollers 441. In the description below, the rotating bodies associated with image creation will be referred to as "imaging rotors".

The improper rotation of the imaging rotors tends to cause periodic density unevenness in the output image. The periodic density unevenness is a phenomenon where the density in the output image varies in the vertical direction in a cycle corresponding to the perimeter of the imaging rotor that is not rotating properly.

In the image processing apparatus 10, the CPU 80 executes an image-defect determination process (described later; see FIG. 3). This enables the CPU 80 to correctly determine the cause of the periodic density unevenness on the basis of the test image g1 obtained through the image reading process performed on the test output sheet 9.

Images, such as the test image g1, to be processed by the CPU 80 are digital image data. The digital image data constitutes map data including a plurality of pixel values corresponding to a coordinate field of two dimensions in a main scanning direction D1 and a sub scanning direction D2 intersecting with the main scanning direction D1 for each of three primary colors. The three primary colors are, for example, red, green, and blue.

The sub scanning direction D2 is orthogonal to the main scanning direction D1. The main scanning direction D1 is the horizontal direction in the test image g1, whereas the sub scanning direction D2 is the vertical direction in the test image g1.

For example, the original test image g01 and the test image g1 are mixed-color halftone images synthesized from a plurality of uniform single-color halftone images respectively corresponding to a plurality of developing colors of the image forming apparatus 2. The plurality of single-color halftone images are those formed uniformly at reference halftone densities respectively set in advance.

In the present embodiment, the original test image g01 and the test image g1 are mixed-color halftone images synthesized from four uniform single-color halftone images respectively corresponding to all the developing colors of the image forming apparatus 2. In the test print process, one test output sheet 9 including one original test image g01 is output. Accordingly, one test image g1 corresponding to the original test image g01 serves as an object in which the image defects are to be identified. The test image g1 in the present embodiment is an example of a mixed-color test image.

In order to execute the image-defect determination process, the plurality of processing modules in the CPU 80 further include a feature-image creation portion 8*c*, a singular-portion identification portion 8*d*, a color-vector identification portion 8*e*, a periodicity determination portion 8*f*, a pattern recognition portion 8g, and a random-unevenness determination portion 8h (see FIG. 2).

[Image-Defect Determination Process]

Figure 3:
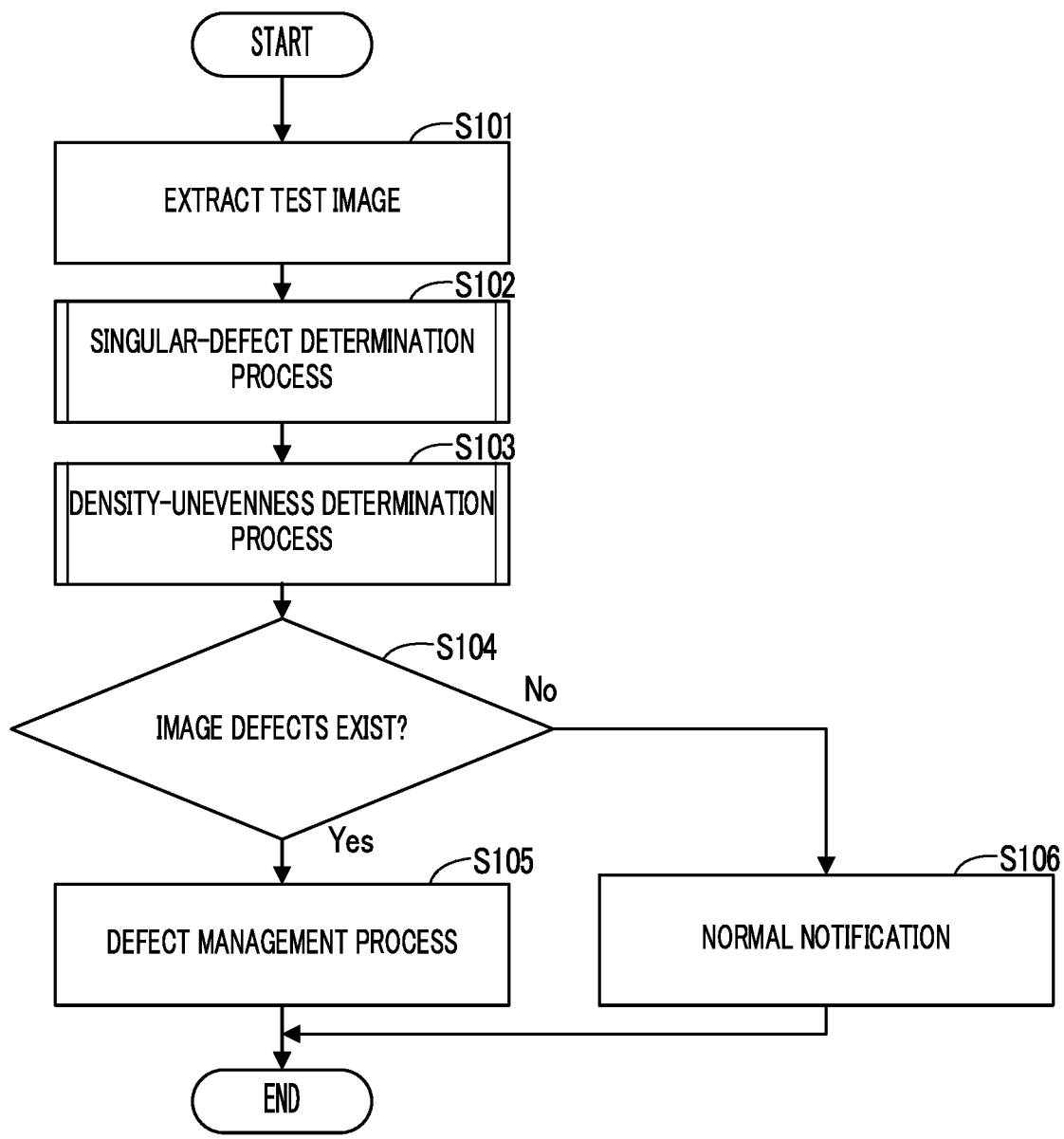
FIG. 3 is a flowchart showing an example of a procedure of an image-defect determination process in the image processing apparatus according to the embodiment.

The following describes an example of a procedure of the image-defect determination process with reference to a flowchart shown in FIG. 3. In the following description, S101, S102, . . . are identification signs representing a plurality of steps in the image-defect determination process.

When the reading process is executed in response to the reading start operation performed on the operation portion 801 after the guide message is displayed in the display portion 802, the main control portion 8a causes the feature-image creation portion 8c to execute a process in step S101 in the image-defect determination process.

<Step S101>

In step S101, the feature-image creation portion 8c creates the test image g1 from the read image obtained through the image reading process performed on the test output sheet 9.

For example, the feature-image creation portion 8c extracts a portion of the original image obtained by removing margins on the outer edges from the read image as the test image g1.

Alternatively, the feature-image creation portion 8c creates the test image g1 by a compression process of compressing the portion of the original image obtained by removing the margins on the outer edges from the read image to a predetermine reference resolution. The feature-image creation portion 8c compresses the read image when the resolution of the read image is higher than the reference resolution. After creating the test image g1, the main control portion 8a moves the process to step S102.

<Step S102>

In step S102, the feature-image creation portion 8c starts a singular-defect determination process (described later). The singular-defect determination process is a process of determining the presence or absence of singular portions Ps1 such as the vertical line Ps11, the horizontal line Ps12, and the spots Ps13 in the test image g1 and the cause of occurrence of the singular portions Ps1 (see FIG. 6). The singular portions Ps1 are examples of the image defects. It is noted that the horizontal line Ps12 corresponds to a horizontal line portion.

When the singular-defect determination process ends, main control portion 8a moves the process to step S103.

<Step S103>

In step S103, the periodicity determination portion 8f starts a density-unevenness determination process (described later). When the density-unevenness determination process ends, the main control portion 8a moves the process to step S104.

<Step S104>

In step S104, the main control portion 8a moves the process to step S105 if it is determined that the image defects exist in step S102 or step S103. Otherwise, the main control portion 8a moves the process to step S106.

<Step S105>

In step S105, the main control portion 8a executes a defect management process associated in advance with the type and cause of the image defects that have been determined to exist in step S102 or step S103.

For example, the defect management process includes either a first management process or a second management process, or both, described below. The first management process is a process of causing the display portion 802 to display a message that prompts the users to replace parts causing the image defects. The second management process is a process of correcting imaging parameters to eliminate or reduce the image defects. The imaging parameters are parameters related to control of the imaging portions 4x.

The main control portion 8a ends the image-defect determination process after executing the defect management process.

<Step S106>

In step S106, the main control portion 8a ends the image-defect determination process after providing normal notification indicating that no image defects have been identified.

[Singular-Defect Determination Process]

Figure 4:
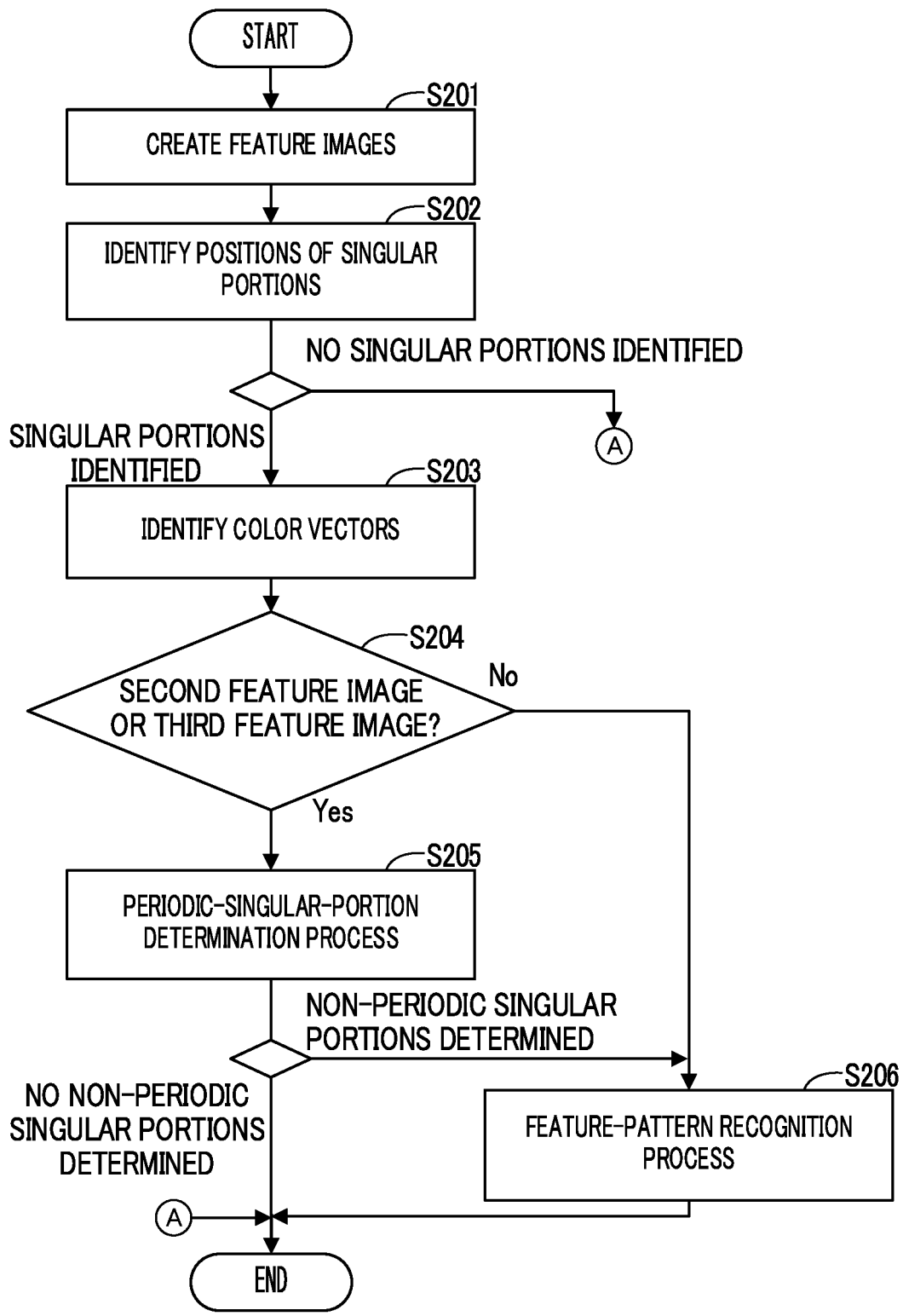
FIG. 4 is a flowchart showing an example of a procedure of a singular-defect determination process in the image processing apparatus according to the embodiment.

The following describes an example of a procedure of the singular-defect determination process in step S102 with reference to a flowchart shown in FIG. 4. In the following description, S201, S202, . . . are identification signs representing a plurality of steps in the singular-defect determination process. The singular-defect determination process starts from step S201.

<Step S201>

First, in step S201, the feature-image creation portion 8c executes a feature extraction process set in advance on the test image g1 to create a plurality of feature images g21, g22, and g23. The feature images g21, g22, and g23 each include the singular portions Ps1 of a specific type set in advance extracted from the test image g1.

In the present embodiment, the plurality of feature images g21, g22, and g23 include a first feature image g21, a second feature image g22, and a third feature image g23 (see FIG. 6).

The first feature image g21 includes the vertical line Ps11 extracted from the test image g1. The second feature image g22 includes the horizontal line Ps12 extracted from the test image g1. The third feature image g23 includes the spots Ps13 extracted from the test image g1.

Figure 7:
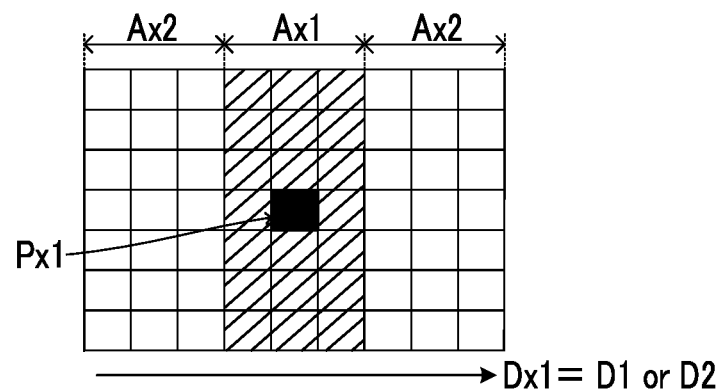
FIG. 7 shows an example of an area of interest and the adjacent areas, the area of interest being sequentially selected from the test image in a main filtering process by the image processing apparatus according to the embodiment.

In the present embodiment, the feature extraction process includes a first preprocessing, a second preprocessing, and a singular-portion extraction process. In the description below, pixels sequentially selected from the test image g1 will be referred to as "pixels Px1 of interest" (see FIGS. 6 and 7).

The feature-image creation portion 8c executes the first preprocessing on the test image g1 in the main scanning direction D1 as a processing direction Dx1 to create a first preprocessed image g11 (see FIG. 6).

Moreover, the feature-image creation portion 8c executes the second preprocessing on the test image g1 in the sub scanning direction D2 as the processing direction Dx1 to create a second preprocessed image g12 (see FIG. 6).

Furthermore, the feature-image creation portion 8c executes the singular-portion extraction process on the first preprocessed image g11 and the second preprocessed image g12 to create the three feature images g21, g22, and g23.

The first preprocessing includes a main filtering process executed in the main scanning direction D1 as the processing direction Dx1. The main filtering process is a process of converting the pixel value of each pixel Px1 of interest sequentially selected from the test image g1 into a converted value obtained by a process of emphasizing the difference between the pixel values in an area Ax1 of interest and the pixel values in two adjacent areas Ax2 of the area Ax1 of interest (see FIGS. 6 and 7).

Each area Ax1 of interest includes the corresponding pixel Px1 of interest, and the two adjacent areas Ax2 adjoin the area Ax1 of interest at both sides of the area Ax1 of interest in the predetermined processing direction Dx1. The area Ax1 of interest and the adjacent areas Ax2 each include at least one pixel.

The sizes of the area Ax1 of interest and the adjacent areas Ax2 are set according to the width of the vertical line Ps11 or the horizontal line Ps12 to be extracted or the size of the spots Ps13 to be extracted.

The area Ax1 of interest and the adjacent areas Ax2 each occupy an identical range extending in a direction intersecting with the processing direction Dx1. In an example shown in FIG. 7, the area Ax1 of interest is composed of 21 pixels arranged in three columns and seven rows with the pixel Px1 of interest in the center. Each of the adjacent areas Ax2 is also composed of 21 pixels arranged in three columns and seven rows. It is noted that, in each of the area Ax1 of interest and the adjacent areas Ax2, the number of rows corresponds to the number of lines in the processing direction Dx1, and the number of columns corresponds to the number of lines in the direction intersecting with the processing direction Dx1. The sizes of the area Ax1 of interest and the adjacent areas Ax2 are set in advance.

In the main filtering process, the pixel values in each area Ax1 of interest are converted into first corrected values using a first correction factor K1 set in advance, and the pixel values in the adjacent areas Ax2 are converted into second corrected values using a second correction factor K2 set in advance.

For example, the first correction factor K1 is a factor of one or more by which the pixel values in the area Ax1 of interest are multiplied, and the second correction factor K2 is a factor of less than zero by which the pixel values in the adjacent areas Ax2 are multiplied. In this case, the first correction factor K1 and the second correction factor K2 are set such that the sum of the product of the first correction factor K1 and the number of pixels in the area Ax1 of interest and the product of the second correction factor K2 and the number of pixels in the two adjacent areas Ax2 becomes zero.

The feature-image creation portion 8c multiplies the pixel values in the area Ax1 of interest by the first correction factor K1 to derive the first corrected values corresponding to the pixels in the area Ax1 of interest, and multiplies the pixel values in the two adjacent areas Ax2 by the second correction factor K2 to derive the second corrected values corresponding to the pixels in the two adjacent areas Ax2. The feature-image creation portion 8c then integrates the first corrected values and the second corrected values to derive the converted value for the pixel value of the pixel Px1 of interest.

For example, the feature-image creation portion 8c adds up the total value or mean value of the first corrected values corresponding to the plurality of pixels in the area Ax1 of interest and the total value or mean value of the second corrected values corresponding to the plurality of pixels in the two adjacent areas Ax2 to derive the converted value.

The absolute value of the converted value corresponds to an amplified absolute value of the difference between the pixel values in the area Ax1 of interest and the pixel values in the two adjacent areas Ax2. The process of deriving the converted value by integrating the first corrected values and the second corrected values is an example of the process of emphasizing the difference between the pixel values in the area Ax1 of interest and the pixel values in the two adjacent areas Ax2.

It is noted that the first correction factor K1 may be negative and that the second correction factor K2 may be positive.

For example, the feature-image creation portion 8c may create first main map data, including the plurality of converted values obtained by the main filtering process executed in the main scanning direction D1 as the processing direction Dx1, as the first preprocessed image g11.

As shown in FIG. 6, in a case where the test image g1 includes either the vertical line Ps11 or the spots Ps13, or both, the first main map data including either the vertical line Ps11 or the spots Ps13, or both, extracted from the test image g1 is created by the main filtering process executed in the main scanning direction D1 as the processing direction Dx1.

In addition, in a case where the test image g1 includes the horizontal line Ps12, the first main map data that does not include the horizontal line Ps12 in the test image g1 is created by the main filtering process executed in the main scanning direction D1 as the processing direction Dx1.

It is noted that the vertical line Ps11 corresponds to a first singular portion, that the horizontal line Ps12 corresponds to a second singular portion, and that the spots Ps13 correspond to third singular portions.

The second preprocessing includes the main filtering process executed in the sub scanning direction D2 as the processing direction Dx1.

For example, the feature-image creation portion 8c may create second main map data, including the plurality of converted values obtained by the main filtering process executed in the sub scanning direction D2 as the processing direction Dx1, as the second preprocessed image g12.

As shown in FIG. 6, in a case where the test image g1 includes either the horizontal line Ps12 or the spots Ps13, or both, the second main map data including either the horizontal line Ps12 or the spots Ps13, or both, extracted from the test image g1 is created by the main filtering process executed in the sub scanning direction D2 as the processing direction Dx1.

In addition, in a case where the test image g1 includes the vertical line Ps11, the second main map data that does not include the vertical line Ps11 in the test image g1 is created by the main filtering process executed in the sub scanning direction D2 as the processing direction Dx1.

However, in the main filtering process, the derived converted values representing the original states of the singular portions Ps1 may be opposite in sign, or incorrect, at both edge portions of the singular portions Ps1 in the processing direction Dx1. Such incorrectly converted values may adversely affect the determination of the image defects when processed as the pixel values representing the singular portions Ps1.

Accordingly, in the present embodiment, the first preprocessing further includes an edge-enhancement filtering process executed in the main scanning direction D1 as the processing direction Dx1 in addition to the main filtering process executed in the main scanning direction D1 as the processing direction Dx1.

Similarly, the second preprocessing includes the edge-enhancement filtering process executed in the sub scanning direction D2 as the processing direction Dx1 in addition to the main filtering process executed in the sub scanning direction D2 as the processing direction Dx1.

The edge-enhancement filtering process is a process of enhancing the edge between each area Ax1 of interest and one of the two adjacent areas Ax2 set in advance.

Specifically, the edge-enhancement filtering process is a process of converting the pixel value of each pixel Px1 of interest sequentially selected from the test image g1 into an edge strength by integrating third corrected values obtained by correcting the pixel values in the area Ax1 of interest using a third correction factor K3 and fourth corrected values obtained by correcting the pixel values in one of the adjacent areas Ax2 using a fourth correction factor K4, where the third correction factor K3 is opposite in sign to the fourth correction factor K4 (see FIG. 6).

In the example shown in FIG. 6, the third correction factor K3 is positive, whereas the fourth correction factor K4 is negative. The third correction factor K3 and the fourth correction factor K4 are set such that the sum of the product of the third correction factor K3 and the number of pixels in the area Ax1 of interest and the product of the fourth correction factor K4 and the number of pixels in one of the adjacent areas Ax2 becomes zero.

The edge-enhancement filtering process executed in the main scanning direction D1 as the processing direction Dx1 creates horizontal edge-strength map data including the edge strengths converted from the pixel values in the test image g1.

Similarly, the edge-enhancement filtering process executed in the sub scanning direction D2 as the processing direction Dx1 creates vertical edge-strength map data including the edge strengths converted from the pixel values in the test image g1.

In the present embodiment, the feature-image creation portion 8c executes the main filtering process in the main scanning direction D1 as the processing direction Dx1 to create the first main map data.

Furthermore, the feature-image creation portion 8c executes the edge-enhancement filtering process in the main scanning direction D1 as the processing direction Dx1 to create the horizontal edge-strength map data.

The feature-image creation portion 8c then corrects the pixel values in the first main map data using the corresponding pixel values in the horizontal edge-strength map data to create the first preprocessed image g11. For example, the feature-image creation portion 8c adds the absolute values of the pixel values in the horizontal edge-strength map data to the pixel values in the first main map data to create the first preprocessed image g11.

Similarly, the feature-image creation portion 8c executes the main filtering process in the sub scanning direction D2 as the processing direction Dx1 to create the second main map data.

Furthermore, the feature-image creation portion 8c executes the edge-enhancement filtering process in the sub scanning direction D2 as the processing direction Dx1 to create the vertical edge-strength map data.

The feature-image creation portion 8c then corrects the pixel values in the second main map data using the corresponding pixel values in the vertical edge-strength map data to create the second preprocessed image g12. For example, the feature-image creation portion 8c adds the absolute values of the pixel values in the vertical edge-strength map data to the pixel values in the second main map data to create the second preprocessed image g12.

The singular-portion extraction process is a process of creating the three feature images g21, g22, and g23 respectively including the vertical line Ps11, the horizontal line Ps12, and the spots Ps13 individually extracted from the first preprocessed image g11 or the second preprocessed image g12. The three feature images g21, g22, and g23 are the first feature image g21, the second feature image g22, and the third feature image g23, respectively.

The first feature image g21 includes singular portions Ps1, extracted from among the singular portions Ps1 composed of one or more significant pixels in the first preprocessed image g11 and the second preprocessed image g12, that are present in the first preprocessed image g11 but not common to the first preprocessed image g11 and the second preprocessed image g12. The first feature image g21 does not include either horizontal lines Ps12 or spots Ps13 but includes vertical lines Ps11 in a case where the first preprocessed image g11 includes the vertical lines Ps11.

It is noted that the significant pixels refer to pixels that are distinguishable from other pixels by comparing the pixel values in the test image g1 or index values based on the pixel values with a predetermined threshold value.

The second feature image g22 includes singular portions Ps1, extracted from among the singular portions Ps1 in the first preprocessed image g11 and the second preprocessed image g12, that are present in the second preprocessed image g12 but not common to the first preprocessed image g11 and the second preprocessed image g12. The second feature image g22 does not include either vertical lines Ps11 or spots Ps13 but includes horizontal lines Ps12 in a case where the second preprocessed image g12 includes the horizontal lines Ps12.

The third feature image g23 includes singular portions Ps1 common to and extracted from the first preprocessed image g11 and the second preprocessed image g12. The third feature image g23 does not include either vertical lines Ps11 or horizontal lines Ps12 but includes spots Ps13 in a case where the first preprocessed image g11 and the second preprocessed image g12 include the spots Ps13.

The three feature images g21, g22, and g23 can be created from the first preprocessed image g11 and the second preprocessed image g12 in various ways.

For example, the feature-image creation portion 8c derives an index value Zi by applying a first pixel value Xi serving as a pixel value exceeding a predetermined reference value in the first preprocessed image g11 and a second pixel value Yi serving as a pixel value exceeding the reference value in the second preprocessed image g12 to the following formula (1). Here, the subscript i is the identification number of the position of each pixel.

[Math 1]

$$Zi = \frac{|Xi| - |Yi|}{|Xi| + |Yi|} \quad (1)$$

The index value Zi of pixels constituting vertical lines Ps11 is a relatively large positive number. In addition, the index value Zi of pixels constituting horizontal lines Ps12 is a relatively small negative number. In addition, the index value Zi of pixels constituting spots Ps13 is zero or close to zero. The index value Zi is an example of an index value of the difference between a pixel value in the first preprocessed image g11 and the corresponding pixel value in the second preprocessed image g12.

The characteristic of the index value Zi described above can be used to simplify the process of extracting vertical lines Ps11 from the first preprocessed image g11, horizontal lines Ps12 from the second preprocessed image g12, and spots Ps13 from the first preprocessed image g11 or the second preprocessed image g12.

For example, the feature-image creation portion 8c converts the first pixel value Xi in the first preprocessed image g11 into a first singularity Pi derived using the following formula (2) to create the first feature image g21. This creates the first feature image g21 including vertical lines Ps11 extracted from the first preprocessed image g11.

[Math 2]

$$Pi = XiZi \quad (2)$$

Moreover, the feature-image creation portion 8c converts the second pixel value Yi in the second preprocessed image g12 into a second singularity Qi derived using the following formula (3) to create the second feature image g22. This creates the second feature image g22 including horizontal lines Ps12 extracted from the second preprocessed image g12.

[Math 3]

$$Qi = Yi(-Zi) \quad (3)$$

Furthermore, the feature-image creation portion 8c converts the first pixel value Xi in the first preprocessed image g11 into a third singularity Ri derived using the following formula (4) to create the third feature image g23. This creates the third feature image g23 including spots Ps13 extracted from the first preprocessed image g11.

[Math 4]

$$Ri = Xi(1-Zi) \quad (4)$$

Alternatively, the feature-image creation portion 8c may convert the second pixel value Yi in the second preprocessed image g12 into the third singularity Ri derived using the following formula (5) to create the third feature image g23. This creates the third feature image g23 including spots Ps13 extracted from the second preprocessed image g12.

[Math 5]

$$Ri = Yi(Zi-1) \quad (5)$$

As described above, the feature-image creation portion 8c creates the first feature image g21 by the process of converting the pixel values in the first preprocessed image g11 using the predetermined formula (2) based on the index value Zi. formula (2) is an example of a first conversion formula.

Moreover, the feature-image creation portion 8c creates the second feature image g22 by the process of converting the pixel values in the second preprocessed image g12 using the predetermined formula (3) based on the index value Zi. formula (3) is an example of a second conversion formula.

Furthermore, the feature-image creation portion 8c creates the third feature image g23 by the process of converting the pixel values in the first preprocessed image g11 or the second preprocessed image g12 using the predetermined formula (4) or (5), respectively, based on the index value Zi. formulas (4) and (5) are examples of a third conversion formula.

The process of creating the first feature image g21, the second feature image g22, and the third feature image g23 in step S201 is an example of the process of extracting vertical lines Ps11, horizontal lines Ps12, and spots Ps13 from one or more singular portions Ps1 in the first preprocessed image g11 and the second preprocessed image g12 as the image defects.

The feature-image creation portion 8c moves the process to step S202 after the feature images g21, g22, and g23 are created.

<Step S202>

In step S202, the singular-portion identification portion 8d identifies the positions of the singular portions Ps1 in the feature images g21, g22, and g23.

For example, the singular-portion identification portion 8d determines that portions with pixel values outside a predetermined reference range in the feature images g21, g22, and g23 are the singular portions Ps1.

In other words, the singular-portion identification portion 8d identifies the portions with the singularities Pi, Qi, and Ri based on the pixel values in the first preprocessed image g11 and the second preprocessed image g12 falling outside the reference range as the singular portions Ps1. The singularities Pi, Qi, and Ri are examples of converted values based on the pixel values in the first preprocessed image g11 and the second preprocessed image g12. In addition, the process by the feature-image creation portion 8c in the present embodiment is an example of a process of identifying the singular portions Ps1 composed of one or more significant pixels in the test image g1.

In addition, in a case where a plurality of singular portions Ps1 exist in a close range set in advance in the main scanning direction D1 or in a close range set in advance in the sub scanning direction D2, the singular-portion identification portion 8d executes a joining process of joining the plurality of singular portions Ps1 into one continuous singular portion Ps1 for each of the feature images g21, g22, and g23.

For example, in a case where the first feature image g21 includes two vertical lines Ps11 separated from each other in the sub scanning direction D2 within the close range, the singular-portion identification portion 8d joins the two vertical lines Ps11 into one vertical line Ps11 by the joining process.

Similarly, in a case where the second feature image g22 includes two horizontal lines Ps12 separated from each other in the main scanning direction D1 within the close range, the singular-portion identification portion 8d joins the two horizontal lines Ps12 into one horizontal line Ps12 by the joining process.

In addition, in a case where the third feature image g23 includes a plurality of spots Ps13 separated from each other in the main scanning direction D1 or in the sub scanning direction D2 within the close range, the singular-portion identification portion 8d joins the plurality of spots Ps13 into one spot Ps13 by the joining process.

In a case where the positions of the singular portions Ps1 are not identified in any of the three feature image g21, g22, and g23, the singular-portion identification portion 8d ends the singular-defect determination process. In a case where the positions of the singular portions Ps1 are identified in one or more of the three feature images g21, g22, and g23, the singular-portion identification portion 8d moves the process to step S203.

<Step S203>

In step S203, the color-vector identification portion 8e identifies color vectors representing vectors inside a color space pointing from either the colors of the singular portions Ps1 or the colors of reference areas including the vicinities of the singular portions Ps1 in the test image g1 to the other.

The reference areas have ranges set in advance relative to the singular portions Ps1. For example, each of the reference areas includes a peripheral area adjoining a singular portion Ps1 but does not include the singular portion Ps1. In addition, each of the reference areas may include a singular portion Ps1 and a peripheral area adjoining the singular portion Ps1.

Originally, the test image g1 is a uniform halftone image. Accordingly, when the test image g1 is properly formed on the test output sheet 9, no singular portions Ps1 are identified, and the color vectors at any positions in the test image g1 are mostly zero vectors.

In a case where a singular portion Ps1 is identified, however, the direction of the color vector between the singular portion Ps1 and the reference area corresponding to the singular portion Ps1 indicates an excess or deficiency in the toner density of one of the four developing colors of the image forming apparatus 2.

Accordingly, the direction of the color vector indicates which of the four imaging portions 4x in the image forming apparatus 2 has caused the singular portion Ps1.

It is noted that the color-vector identification portion 8e may identify a vector inside the color space pointing from either the color of the singular portion Ps1 or a predetermined reference color to the other in the test image g1 as the color vector. In this case, the reference color is the original color of the test image g1.

Furthermore, in step S203, the color-vector identification portion 8e determines the developing color causing the singular portion Ps1 and whether the density of the developing color is excessive or deficient on the basis of the color vector.

For example, the secondary storage device 82 stores in advance information about a plurality of unit vectors each indicating the direction along which the density of cyan, magenta, yellow, or black increases or decreases relative to the reference color of the test image g1.

The color-vector identification portion 8e normalizes the color vector to a predetermined unit length. Furthermore, the color-vector identification portion 8e determines to which of the plurality of unit vectors each corresponding to an excess or deficiency in the density of cyan, magenta, yellow, or black the normalized color vector is closest to determine the developing color causing the singular portion Ps1 and whether the density of the developing color is excessive or deficient.

After executing the process in step S203, the color-vector identification portion 8e moves the process to step S204.

<Step S204>

In step S204, the periodicity determination portion 8f moves the process to step S205 in a case where singular portions Ps1 are identified in one or both of the second feature image g22 and the third feature image g23. Otherwise, the periodicity determination portion 8f moves the process to step S206.

In the description below, one or both of the second feature image g22 and the third feature image g23 including identified singular portions Ps1 are images in which the periodicities of the singular portions Ps1 are to be determined, and will be referred to as "images for periodicity determination". The singular portions Ps1 in the images for periodicity determination are horizontal lines Ps12 or spots Ps13 (see FIG. 6).

<Step S205>

In step S205, the periodicity determination portion 8f executes a periodic-singular-portion determination process on the images for periodicity determination. The periodic-singular-portion determination process includes a number determination process, a periodicity determination process, and a cause-of-periodicity determination process.

The number determination process is a process of determining the numbers of singular portions Ps1 lying in the sub scanning direction D2 in the images for periodicity determination.

Specifically, the periodicity determination portion 8f counts how many horizontal lines Ps12 occupying more than a predetermined percentage of an identical range in the main scanning direction D1 appear in the sub scanning direction D2 in the second feature image g22 to determine the number of horizontal lines Ps12 lying in the sub scanning direction D2.

Furthermore, the periodicity determination portion 8f counts how many spots Ps13 of which displacements in the main scanning direction D1 are within a predetermined range appear in the sub scanning direction D2 in the third feature image g23 to determine the number of spots Ps13 lying in the sub scanning direction D2.

The periodicity determination portion 8f executes the periodicity determination process on the singular portions Ps1 only when the number of singular portions Ps1 lying in the sub scanning direction D2 is two or more.

In a case where only one singular portion Ps1 lies in the sub scanning direction D2, the periodicity determination portion 8f determines that there is no periodicity and skips the periodicity determination process and the cause-of-periodicity determination process.

The periodicity determination process is a process of determining the presence or absence of one or more predetermined periodicities in the sub scanning direction D2 in the images for periodicity determination. The periodicities correspond to the outer perimeters of the imaging rotors. The states of the imaging rotors affect the quality of images formed on the sheets.

In a case where the image defects are caused by defects in the imaging rotors, the periodicities corresponding to the outer perimeters of the imaging rotors may appear as intervals between the plurality of horizontal lines Ps12 or the plurality of spots Ps13 in the sub scanning direction D2.

Accordingly, in a case where the images for periodicity determination have the periodicities corresponding to the outer perimeters of the imaging rotors, the imaging rotors corresponding to the periodicities can be the cause of the horizontal lines Ps12 or the spots Ps13 in the images for periodicity determination.

In a case where two singular portions Ps1 lie in the sub scanning direction D2 in the images for periodicity determination, the periodicity determination portion 8f executes an interval acquisition process as the periodicity determination process.

In the interval acquisition process, the periodicity determination portion 8f derives the interval between the two singular portions Ps1 in the sub scanning direction D2 as the period of the two singular portions Ps1.

In a case where three or more singular portions Ps1 lie in the sub scanning direction D2 in the images for periodicity determination, the periodicity determination portion 8f executes a frequency analysis process as the periodicity determination process.

In the frequency analysis process, the periodicity determination portion 8f performs a Fourier transform on the images for periodicity determination including the three or more singular portions Ps1 lying in the sub scanning direction D2 to identify the singular portion frequency serving as dominant in the frequency distribution of data strings of the singular portions Ps1 in the images for periodicity determination.

Furthermore, the periodicity determination portion 8f derives the period corresponding to the singular portion frequency as the period of the three or more singular portions Ps1.

In the cause-of-periodicity determination process, the periodicity determination portion 8f determines whether a plurality of candidates for the imaging rotors set in advance satisfy a close period condition defined in advance between the outer perimeters of the candidates and the period of the singular portions Ps1. The plurality of candidates for the imaging rotors in step S205 are an example of a plurality of candidates for the cause set in advance corresponding to the horizontal lines Ps12 or the spots Ps13.

In the description below, among the singular portions Ps1 included in the second feature image g22 and the third feature image g23, singular portions Ps1 corresponding to any of the candidates for the imaging rotors determined to satisfy the close period condition are referred to as "periodic singular portions", and the other singular portions Ps1 are referred to as "non-periodic singular portions".

In the cause-of-periodicity determination process, the periodicity determination portion 8f determines that one of the candidates for the imaging rotors determined to satisfy the close period condition has caused the periodic singular portions. Thus, the cause of the horizontal lines Ps12 or the spots Ps13 is determined.

In addition, in step S205, the periodicity determination portion 8f determines which imaging rotors in the four imaging portions 4x respectively corresponding to different developing colors have caused the horizontal lines Ps12 or the spots Ps13 on the basis of the color vectors determined in step S203.

In addition, in a case where three or more singular portions Ps1 lying in the sub scanning direction D2 include the non-periodic singular portions that do not correspond to the singular portion frequency, the periodicity determination portion 8f executes a feature-pattern recognition process (described later) on the non-periodic singular portions.

For example, the periodicity determination portion 8f performs an inverse Fourier transform on a frequency distribution obtained by removing frequency components other than the singular portion frequency from the frequency distribution obtained by the Fourier transform to create inverse Fourier transform data.

Furthermore, among the three or more singular portions Ps1 lying in the sub scanning direction D2, the periodicity determination portion 8f determines those existing at positions away from the peak positions in a waveform in the sub scanning direction D2 represented by the inverse Fourier transform data as the non-periodic singular portions.

In a case where it is determined that the second feature image g22 and the third feature image g23 do not include the non-periodic singular portions as a result of the process in step S205, the periodicity determination portion 8f ends the singular-defect determination process.

In a case where it is determined that the second feature image g22 and the third feature image g23 include the non-periodic singular portions as a result of the process in step S205, the periodicity determination portion 8f moves the process to step S206.

<Step S206>
In step S206, the pattern recognition portion 8g executes the feature-pattern recognition process on the first feature image g21 and the second feature image g22 and the third feature image g23 each including the non-periodic singular portions. The second feature image g22 including the non-periodic singular portions or the third feature image g23 including the non-periodic singular portions are examples of a non-periodic feature image.

In the feature-pattern recognition process, the first feature image g21 and the second feature image g22 and the third feature image g23 each including the non-periodic singular portions serve as input images. The pattern recognition portion 8g performs pattern recognition on the input images in the feature-pattern recognition process to determine which input images correspond to the plurality of candidates for the cause set in advance corresponding to the image defects.

The input images subjected to the feature-pattern recognition process may include the horizontal edge-strength map data or the vertical edge-strength map data obtained by the edge-enhancement filtering process. For example, in the feature-pattern recognition process for determining vertical lines Ps11, the first feature image g21 and the horizontal edge-strength map data are used as the input images.

Similarly, in the feature-pattern recognition process for determining horizontal lines Ps12, the second feature image g22 and the vertical edge-strength map data are used as the input images.

Similarly, in the feature-pattern recognition process for determining spots Ps13, the third feature image g23 and one or both of the horizontal edge-strength map data and the vertical edge-strength map data are used as the input images.

For example, the feature-pattern recognition process is a process of classifying the input images into one of the plurality of candidates for the cause using learning models trained in advance with training data including a plurality of sample images corresponding to the plurality of candidates for the cause.

For example, the learning models include models adopting a machine learning algorithm for classification called "random forest", models adopting a machine learning algorithm called "SVM (Support Vector Machine)", and models adopting a CNN (Convolutional Neural Network) algorithm.

The learning models are separately prepared for the first feature image g21 and the second feature image g22 and the third feature image g23 each including the non-periodic singular portions. In addition, the plurality of sample images are used as the training data for each candidate for the cause.

In addition, in step S206, the pattern recognition portion 8g determines which parts in the four imaging portions 4x respectively corresponding to different developing colors have caused the vertical line Ps11, the horizontal line Ps12, or the spots Ps13 on the basis of the color vector determined in step S203.

The process in step S206 determines the cause of the vertical lines Ps11 and the cause of the horizontal line Ps12 and the spots Ps13 determined as the non-periodic singular portions. The pattern recognition portion 8g ends the singular-defect determination process after executing the process in step S206.

Figure 5:
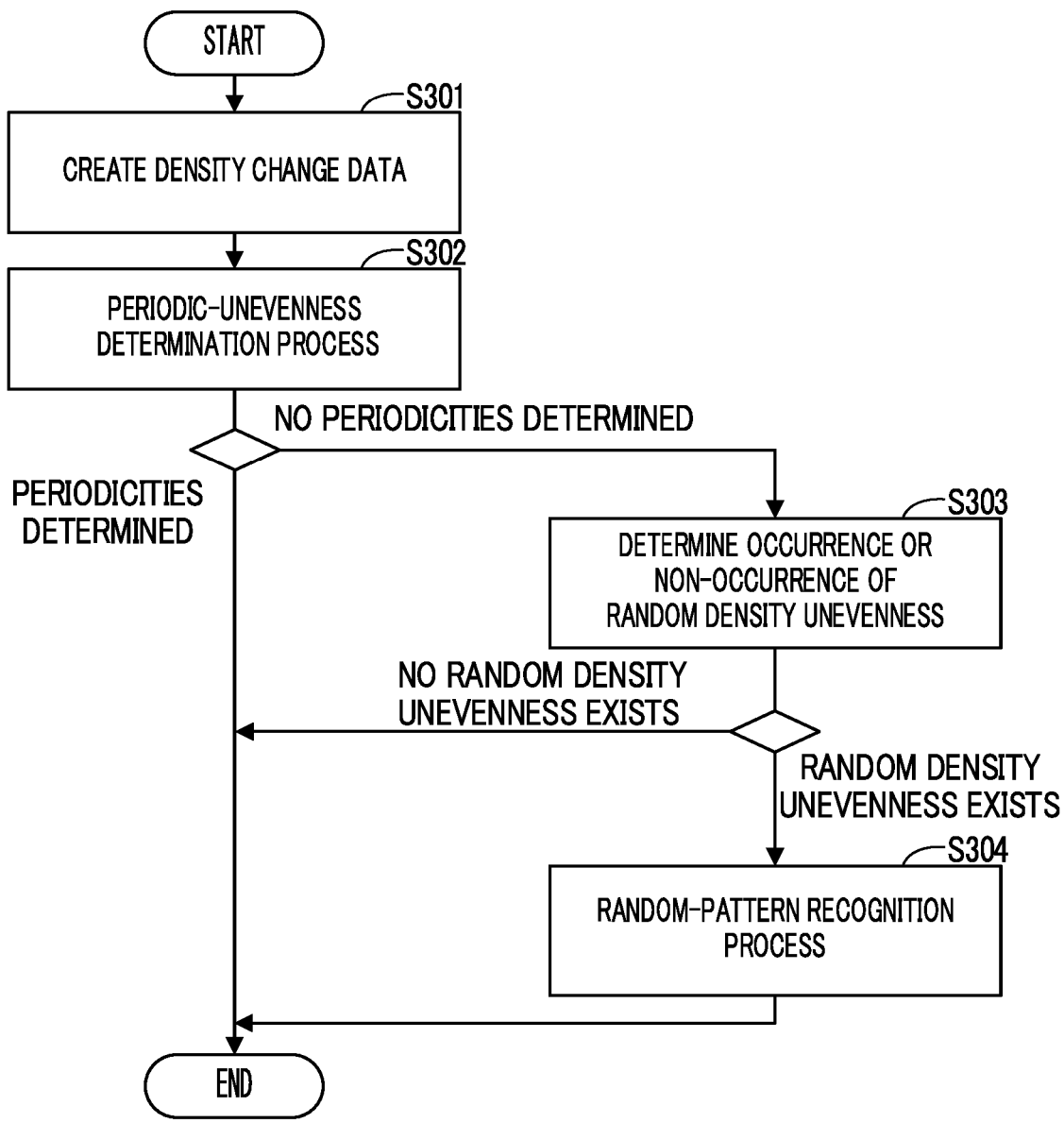
FIG. 5 is a flowchart showing an example of a procedure of a density-unevenness determination process in the image processing apparatus according to the embodiment.

[Density-Unevenness Determination Process]
The following describes an example of a procedure of the density-unevenness determination process in step S103 with reference to a flowchart shown in FIG. 5. In the following description, S301, S302, . . . are identification signs representing a plurality of steps in the density-unevenness determination process. The density-unevenness determination process starts from step S301.

<Step S301>
In step S301, the periodicity determination portion 8f derives a vertical data string VD1 from the test image g1 for each of predetermined specific colors. The specific colors correspond to the developing colors of the image forming apparatus 2. The vertical data strings VD1 are data strings of representative values V1 of a plurality of pixel values in each line in the main scanning direction D1 in images of the specific colors constituting the test image g1 (see FIG. 8). It is noted that the representative values V1 correspond to horizontal representative values.

For example, the specific colors correspond to three chromatic colors of the four developing colors of the image forming apparatus 2. In this case, the periodicity determination portion 8$f$ converts image data about red, green, and blue constituting the test image g1 into image data about cyan, yellow, and magenta.

The periodicity determination portion 8$f$ derives the representative values V1 of the plurality of pixel values in each line in the main scanning direction D1 from each piece of image data about the three specific colors corresponding to the test image g1 to derive three vertical data strings VD1 corresponding to cyan, yellow, and magenta.

It is noted that the specific colors may be the three primary colors of red, green, and blue. In this case, the periodicity determination portion 8$f$ converts the pixel values in three pieces of image data about red, green, and blue in the test image g1 into values representing ratios to the mean values or total values of the pixel values in the three pieces of image data about red, green, and blue in the test image g1. Furthermore, the periodicity determination portion 8$f$ derives three vertical data strings VD1 from the three pieces of image data after conversion.

Here, red corresponds to cyan, green corresponds to magenta, and blue corresponds to yellow. That is, density unevenness of cyan appears as density unevenness in the converted image data about red, density unevenness of magenta appears as density unevenness in the converted image data about green, and density unevenness of yellow appears as density unevenness in the converted image data about blue.

For example, the periodicity determination portion 8$f$ derives the representative values V1 from portions excluding the singular portions Ps1 in the test image g1. In this case, the representative values V1 are, for example, the mean values, maximum values, or minimum values of the pixel values remaining after the pixel values of the singular portions Ps1 are removed from all the pixel values in the lines in the main scanning direction D1. It is noted that the representative values V1 may be, for example, the mean values, maximum values, or minimum values of all the pixel values in the lines in the main scanning direction D1.

After executing the process in step S301, the periodicity determination portion 8$f$ moves the process to step S302.

<Step S302>

In step S302, the periodicity determination portion 8$f$ executes a periodic-unevenness determination process on the vertical data string VD1 for each of the specific colors.

For example, the periodicity determination portion 8$f$ performs frequency analysis such as Fourier transform on each vertical data string VD1 to identify the density unevenness frequency serving as a dominant frequency in the frequency distribution of the vertical data string VD1.

Furthermore, the periodicity determination portion 8$f$ derives the period corresponding to the density unevenness frequency as the period of the density unevenness in the test image g1.

Furthermore, the periodicity determination portion 8$f$ determines whether the plurality of candidates for the imaging rotors set in advance satisfy the close period condition defined between the outer perimeters of the candidates and the period of the density unevenness. If any of the plurality of candidates for the imaging rotors is determined to satisfy the close period condition, it means that periodic density unevenness is determined to exist in the test image g1.

The plurality of candidates for the imaging rotors in step S302 are an example of the plurality of candidates for the cause set in advance corresponding to the periodic density unevenness in the test image g1. The periodic density unevenness is an example of the image defects.

Furthermore, the periodicity determination portion 8$f$ determines the cause of the periodic density unevenness on the basis of the developing color corresponding to the vertical data string VD1 and the candidate for the imaging rotor determined to satisfy the close period condition.

It is noted that, in a case where the periodic density unevenness is caused by the imaging portion 4$x$ of black, the pixel values in all the pieces of image data about red, green, and blue constituting the test image g1 vary.

Accordingly, upon determining that the periodic density unevenness with periodicity common to all of cyan, magenta, and yellow exist, the periodicity determination portion 8$f$ determines that the imaging portion 4$x$ of black has caused the periodic density unevenness.

Upon determining that the periodic density unevenness exists in the test image g1, the periodicity determination portion 8$f$ ends the density-unevenness determination process. Otherwise, the periodicity determination portion 8$f$ moves the process to step S303.

It is noted that, in a case where the variation in the representative values V1 in the vertical data strings VD1 does not exceed a predetermined allowable range, the periodicity determination portion 8$f$ may determine that the periodic density unevenness does not exist in the test image g1. In this case, the degree of variation in the representative values V1 is determined by, for example, the variance, standard deviation, or difference between the median and the maximum or minimum value of the representative values V1.

As described above, in step S302, the periodicity determination portion 8$f$ performs frequency analysis on the vertical data strings VD1 to determine the presence or absence of one or more predetermined periodicities in the vertical data strings VD1.

Furthermore, in step S302, the periodicity determination portion 8$f$ determines the occurrence or non-occurrence of the periodic density unevenness serving as a type of the image defects and the cause of occurrence according to the determination results on the periodicities.

<Step S303>

In step S303, the random-unevenness determination portion 8$h$ determines the occurrence or non-occurrence of random density unevenness in each piece of image data about the three specific colors corresponding to the test image g1. The random density unevenness is an example of the image defects.

The random-unevenness determination portion 8$h$ determines whether the variation in the pixel values in each piece of image data about the three specific colors exceeds a predetermined allowable range to determine the occurrence or non-occurrence of random density unevenness.

For example, the degree of variation in the pixel values is determined by, for example, the variance, standard deviation, or difference between the median and the maximum or minimum value in each piece of image data about the specific colors.

It is noted that, upon determining that random density unevenness exists in all of cyan, magenta, and yellow, the random-unevenness determination portion 8$h$ determines that the imaging portion 4$x$ of black has caused the random density unevenness.

Upon determining that the random density unevenness exists in the test image g1, the random-unevenness determination portion 8$h$ moves the process to step S304. Otherwise, the random-unevenness determination portion 8h ends the density-unevenness determination process.

<Step S304>

In step S304, the pattern recognition portion 8g executes a random-pattern recognition process. The random-pattern recognition process is a process of performing pattern recognition on an input image, using the test image g1 determined to have the random density unevenness as the input image, to determine to which of the one or more candidates for the cause the input image corresponds.

The pattern recognition portion 8g ends the density-unevenness determination process after executing the process in step S304.

The execution of the image-defect determination process including the singular-defect determination process and the density-unevenness determination process by the CPU 80 is an example of the image processing method for determining the cause of the image defects on the basis of the test image g1 read from the output sheet output by the image forming apparatus 2.

As described above, the feature-image creation portion 8c executes the first preprocessing including the main filtering process in the horizontal direction of the test image g1 as the processing direction Dx1 to create the first preprocessed image g11. The main filtering process is the process of converting the pixel value of each pixel Px1 of interest sequentially selected from the test image g1 into the converted value obtained by the process of emphasizing the difference between the pixel values in the area Ax1 of interest and the pixel values in two adjacent areas Ax2 adjoining the area Ax1 of interest at both sides of the area Ax1 of interest in the predetermined processing direction Dx1 (see step S201 in FIG. 4 and FIG. 6).

Moreover, the feature-image creation portion 8c executes the second preprocessing including the main filtering process in the vertical direction of the test image g1 as the processing direction Dx1 to create the second preprocessed image g12 (see step S201 in FIG. 4 and FIG. 6).

Furthermore, the feature-image creation portion 8c extracts the vertical lines Ps11, the horizontal lines Ps12, and the spots Ps13 from one or more singular portions Ps1 in the first preprocessed image g11 and the second preprocessed image g12 as the image defects (see step S201 in FIG. 4 and FIG. 6).

The feature extraction process in step S201 is a simple process with a small computational load. This simple process creates the three feature images g21, g22, and g23 that respectively include the singular portions Ps1 with different shapes individually extracted from the single test image g1.

The periodicity determination portion 8f and the pattern recognition portion 8g respectively execute the periodic-singular-portion determination process and the feature-pattern recognition process using the first feature image g21, the second feature image g22, and the third feature image g23 to determine the cause of the vertical lines Ps11, the horizontal lines Ps12, and the spots Ps13 serving as the types of the image defects (see steps S205 and S206 in FIG. 4 and FIG. 6).

The cause of the image defects can be determined with high accuracy by relatively simple determination processes performed separately on the three feature images g21, g22, and g23 that respectively include the singular portions Ps1 of different types.

The periodic-singular-portion determination process in step S205 determines the presence or absence of the one or more predetermined periodicities in the sub scanning direction D2 in the second feature image g22 or the third feature image g23, and determines the cause of the horizontal lines Ps12 or the spots Ps13 according to the determination results on the periodicities.

In the case where the horizontal lines Ps12 or the spots Ps13 are caused by the defects in the imaging rotors, the cause of the horizontal lines Ps12 or the spots Ps13 can be determined with high accuracy by the periodic-singular-portion determination process of determining the periodicities corresponding to the outer perimeters of the imaging rotors.

In addition, the feature-pattern recognition process in step S206 is the process of determining to which of the plurality of candidates for the cause set in advance corresponding to the vertical lines, the horizontal lines, and the spots the input images correspond by performing the pattern recognition on the input images. Here, the first feature image g21 and either or both of the second feature image g22 and the third feature image g23 determined to have no periodicities by the periodic-singular-portion determination process are the input images in step S206 (see steps S204 to S206 in FIG. 4).

The periodic-singular-portion determination process in step S205 and the feature-pattern recognition process in step S206 are examples of a predetermined cause determination process using the first feature image g21, the second feature image g22, and the third feature image g23.

The feature-pattern recognition process using the learning models or the like is performed on each of the feature images g21, g22, and g23 respectively including the extracted singular portions Ps1 of the specific types. This enables the cause of the image defects to be determined with high accuracy while preventing an increase in the amount of computation by the CPU 80. In addition, the learning model for the singular portions Ps1 of each type can be sufficiently trained using a relatively small amount of training data corresponding to the singular portions Ps1 of the specific type.

In addition, among the plurality of feature images g21, g22, and g23, the feature-pattern recognition process in step S206 is executed on the first feature image g21 that has not been subjected to the periodic-singular-portion determination process in step S205 and on the second feature image g22 or the third feature image g23 determined to have no periodicities by the periodic-singular-portion determination process in step S205 (see steps S204 to S206 in FIG. 4).

In the above-described case, the possibility that the image defects are caused by the periodicities of the imaging rotors can be excluded in the feature-pattern recognition process. This further simplifies the feature-pattern recognition process.

In addition, the color-vector identification portion 8e identifies the color vectors representing the vectors inside the color space pointing from either the colors of the singular portions Ps1 or the colors of the reference areas including the vicinities of the singular portions Ps1 in the test image g1 to the other (see step S203 in FIG. 4).

In the cause determination process, the periodicity determination portion 8f in step S205 and the pattern recognition portion 8g in step S206 determine the cause of the vertical lines Ps11, the horizontal lines Ps12, and the spots Ps13 further using the color vectors. That is, the periodicity determination portion 8f and the pattern recognition portion 8g determine to which of the plurality of developing colors of the image forming apparatus 2 the cause of the image defects corresponds using the color vectors.

In the image forming apparatus 2 capable of printing color images, the use of the color vectors allows easy and reliable determination to which of the plurality of developing colors the cause of the image defects corresponds.

In addition, the periodicity determination portion 8f executes the periodic-unevenness determination process on the test image g1 for each predetermined specific color (see steps S301 and S302 in FIG. 5). The periodic-unevenness determination process is the process of determining the presence or absence of the one or more predetermined periodicities in the sub scanning direction D2 and further determining the occurrence or non-occurrence of the periodic density unevenness serving as a type of the image defects and the cause of occurrence according to the determination results on the periodicities.

The periodic-unevenness determination process enables the cause of the periodic density unevenness to be determined with high accuracy.

In addition, for the test image g1 determined to have no periodicities by the periodic-unevenness determination process in step S302, the random-unevenness determination portion 8h determines whether the variation in the pixel values exceeds the predetermined allowable range for each of the specific colors to determine the occurrence or non-occurrence of the random density unevenness (see step S303 in FIG. 5). The random density unevenness is an example of the image defects.

In addition, the pattern recognition portion 8g executes the random-pattern recognition process on the test image g1 determined to have the random density unevenness as the input image (see step S304 in FIG. 5). The random-pattern recognition process performs pattern recognition on the input image to determine to which of the one or more candidates for the cause the input image corresponds.

In addition, the test image g1 is the mixed-color halftone image synthesized from the plurality of uniform single-color halftone images respectively corresponding to the plurality of developing colors of the image forming apparatus 2. This enables the CPU 80 to determine the cause of the image defects for all the developing colors of the image forming apparatus 2 using fewer test images g1 than the number of developing colors used by the image forming apparatus 2.

[First Application Example]

Figure 9:
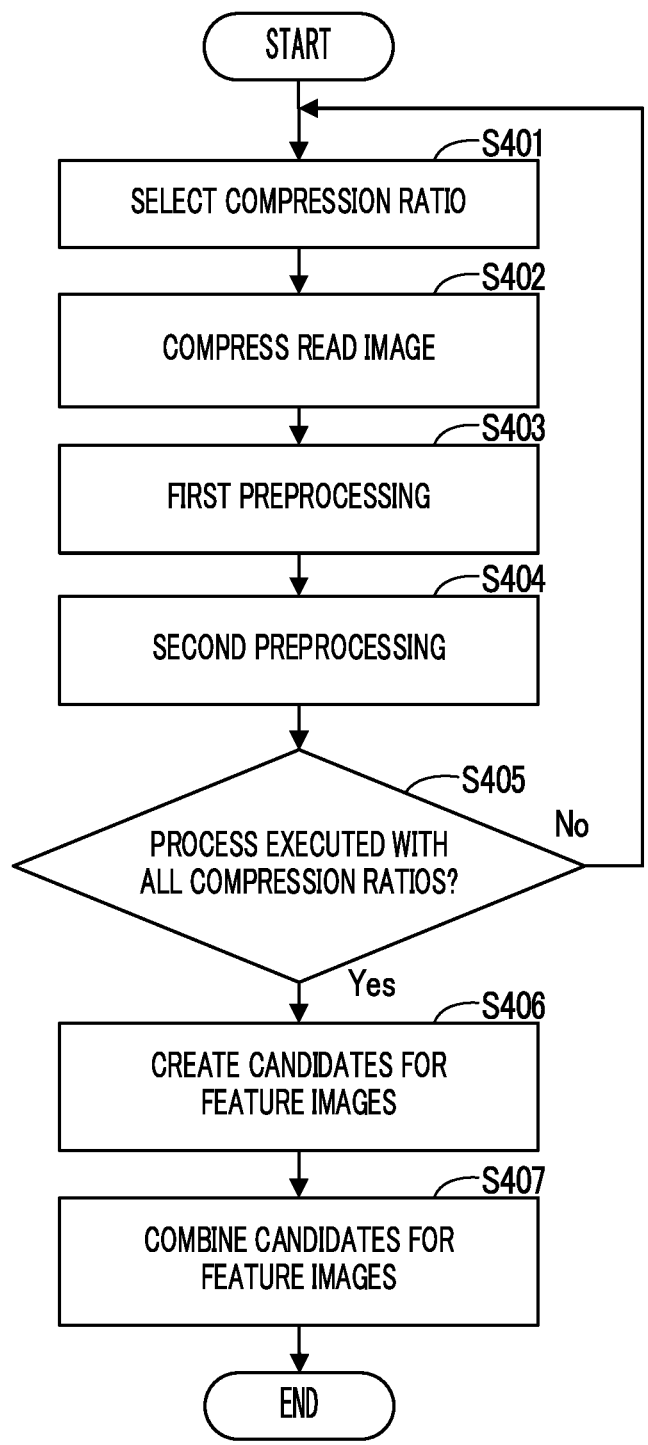
FIG. 9 is a flowchart showing an example of a procedure of a feature-image creation process in a first application example of the image processing apparatus according to the embodiment.

The following describes the procedure of the feature-image creation process in a first application example of the image processing apparatus 10 with reference to a flowchart shown in FIG. 9.

In the following description, S401, S402, . . . are identification signs representing a plurality of steps in the feature-image creation process according to the present application example. The feature-image creation process according to the present application example starts from step S401.

<Step S401>

In step S401, the feature-image creation portion 8c selects a compression ratio to be adopted from a plurality of candidates for the compression ratio set in advance and moves the process to step S402.

<Step S402>

In step S402, the feature-image creation portion 8c compresses the read image with the selected compression ratio to create the test image g1. The processes in step S401 and S402 are an example of a compression process. Subsequently, the feature-image creation portion 8c moves the process to step S403.

<Step S403>

In step S403, the feature-image creation portion 8c executes the first preprocessing on the compressed test image g1 obtained in step S402 to create the first preprocessed image g11. Subsequently, the feature-image creation portion 8c moves the process to step S404.

<Step S404>

In step S404, the feature-image creation portion 8c executes the second preprocessing on the compressed test image g1 obtained in step S402 to create the second preprocessed image g12. Subsequently, the feature-image creation portion 8c moves the process to step S405.

<Step S405>

In step S405, the feature-image creation portion 8c moves the process to step S406 when the processes in steps S401 to S404 have been executed with all the plurality of compression ratios. Otherwise, the feature-image creation portion 8c executes the processes in steps S401 to S404 with different compression ratios.

In the compression process in steps S401 and S402, the feature-image creation portion 8c compresses the read image with the plurality of compression ratios to create the plurality of test images g1 of different sizes.

Furthermore, in steps S403 and S404, the feature-image creation portion 8c executes the first preprocessing and the second preprocessing on the plurality of test images g1 to create the plurality of first preprocessed images g11 and the plurality of second preprocessed images g12, respectively, corresponding to the plurality of test images g1.

<Step S406>

In step S406, the feature-image creation portion 8c executes the singular-portion extraction process on the plurality of first preprocessed images g11 and the plurality of second preprocessed images g12. Thus, the feature-image creation portion 8c creates a plurality of candidates for the first feature image g21, the second feature image g22, and the third feature image g23 corresponding to the plurality of test images g1. Subsequently, the feature-image creation portion 8c moves the process to step S407.

<Step S407>

In step S407, the feature-image creation portion 8c combines the plurality of candidates obtained in step S406 to create the first feature image g21, the second feature image g22, and the third feature image g23. Subsequently, the feature-image creation portion 8c ends the feature-image creation process.

For example, the feature-image creation portion 8c sets the representative values such as the maximum values or mean values of the pixel values in the plurality of candidates for the first feature image g21 as the pixel values in the first feature image g21. The same applies to the second feature image g22 and the third feature image g23.

The processes in steps S401 to S404 are an example of a process of creating the plurality of first preprocessed images g11 and the plurality of second preprocessed images g12 by executing the first preprocessing and the second preprocessing a plurality of times with different size ratios of the sizes of the test images g1 to the sizes of the areas Ax1 of interest and the adjacent areas Ax2. Changing the compression ratio is an example of changing the size ratio of the size of the test image g1 to the size of the area Ax1 of interest and the adjacent areas Ax2.

In addition, the processes in steps S406 and S407 are an example of a process of creating the first feature image g21, the second feature image g22, and the third feature image g23 by the singular-portion extraction process based on the plurality of first preprocessed images g11 and the plurality of second preprocessed images g12.

Adopting the present application example allows complete extraction of vertical lines Ps11 or horizontal lines Ps12 of different thicknesses or spots Ps13 of different sizes.

The first preprocessing and the second preprocessing in the present application example are an example of the process of creating the plurality of first preprocessed images g11 and the plurality of second preprocessed images g12 by executing the first preprocessing and the second preprocessing a plurality of times with the different size ratios of the sizes of the test images g1 to the sizes of the areas Ax1 of interest and the adjacent areas Ax2.

It is noted that the feature-image creation portion 8c may execute the first preprocessing and the second preprocessing a plurality of times while changing the filter size to create the plurality of first preprocessed images g11 and the plurality of second preprocessed images g12.

The filter size corresponds to the size of the area Ax1 of interest and the adjacent areas Ax2 in the first preprocessing and the second preprocessing. Changing the filter size is an example of changing the size ratio of the size of the test image g1 to the size of the area Ax1 of interest and the adjacent areas Ax2.

In addition, in the present application example, the feature-image creation portion 8c may respectively combine the plurality of first preprocessed images g11 and the plurality of second preprocessed images g12 into one.

For example, the feature-image creation portion 8c sets the representative values such as the maximum values or mean values of the pixel values in the plurality of first preprocessed images g11 as the pixel values in the combined first feature image g21. The same applies to the plurality of second preprocessed images g12.

Furthermore, the feature-image creation portion 8c may execute the singular-portion extraction process on the combined first preprocessed image g11 and the combined second preprocessed image g12. Thus, the first feature image g21, the second feature image g22, and the third feature image g23 are created.

[Second Application Example]

The following describes the feature-image creation process in a second application example of the image processing apparatus 10.

In the present application example, the feature-image creation portion 8c identifies portions with pixel values outside a predetermined reference range in the first preprocessed image g11 and the second preprocessed image g12 as singular portions Ps1.

That is, in the present application example, the feature-image creation portion 8c identifies the singular portions Ps1 according to the magnitudes of the pixel values in the first preprocessed image g11 and the second preprocessed image g12 in the singular-portion extraction process. The process by the feature-image creation portion 8c in the present application example is an example of the process of identifying the singular portions Ps1 composed of one or more significant pixels in the test image g1.

Moreover, the feature-image creation portion 8c removes singular portions Ps1 common to the first preprocessed image g11 and the second preprocessed image g12 from the singular portions Ps1 in the first preprocessed image g11 to extract vertical lines Ps11.

Yet moreover, the feature-image creation portion 8c removes the singular portions Ps1 common to the first preprocessed image g11 and the second preprocessed image g12 from the singular portions Ps1 in the second preprocessed image g12 to extract horizontal lines Ps12.

Furthermore, the feature-image creation portion 8c extracts the singular portions Ps1 common to the first preprocessed image g11 and the second preprocessed image g12 as spots Ps13.

For example, the feature-image creation portion 8c converts the first pixel value Xi determined to be other than the vertical lines Ps11 in the first preprocessed image g11 into an interpolated value based on the surrounding pixel values to create the first feature image g21.

Similarly, the feature-image creation portion 8c converts the second pixel value Yi determined to be other than the horizontal lines Ps12 in the second preprocessed image g12 into an interpolated value based on the surrounding pixel values to create the second feature image g22.

Similarly, the feature-image creation portion 8c converts the first pixel value Xi determined to be other than the spots Ps13 in the first preprocessed image g11 into an interpolated value based on the surrounding pixel values to create the third feature image g23.

Alternatively, the feature-image creation portion 8c may convert the second pixel value Yi determined to be other than the spots Ps13 in the second preprocessed image g12 into an interpolated value based on the surrounding pixel values to create the third feature image g23.

[Third Application Example]

The following describes the image-defect determination process in a third application example of the image processing apparatus 10.

In general, detecting shades of yellow accurately from an image in which yellow and other colors are mixed using an image sensor may be difficult depending on the densities of the colors. Similarly, detecting shades of chromatic colors accurately from an image in which black and the chromatic colors are mixed using an image sensor may also be difficult depending on the densities of the colors.

In the present application example, the job control portion 8b outputs two or three test output sheets 9 each including a different original test image g01 formed thereon in the test print process.

In a case where three test output sheets 9 are output, the output sheets are a sheet on which an original mixed-color test image, synthesized from a uniform single-color halftone image of cyan and a uniform single-color halftone image of magenta, is formed; a sheet on which an original yellow test image, serving as a uniform single-color halftone image of yellow, is formed; and a sheet on which an original gray test image, serving as a uniform single-color halftone image of black, is formed.

In a case where two test output sheets 9 are output, the output sheets are a sheet on which a mixed-color test image, synthesized from a uniform single-color halftone image of cyan, a uniform single-color halftone image of magenta, and a uniform single-color halftone image of yellow, is formed and a sheet on which the original gray test image is formed.

Accordingly, the test images g1 in the present application example include a mixed-color test image, a yellow test image, and a gray test image respectively corresponding to the original mixed-color test image, the original yellow test image, and the original gray test image.

The yellow test image and the gray test image are halftone images each composed of a single developing color different from the colors mixed in the mixed-color test image. The yellow test image and the gray test image are examples of a single-color test image.

In the present application example, the feature-image creation portion 8c creates the first feature image g21, the second feature image g22, and the third feature image g23 for each of the mixed-color test image and the single-color test image read from the plurality of test output sheets 9.

Furthermore, in the present application example, the singular-portion identification portion 8d identifies the positions of singular portions Ps1 in the first feature images g21, the second feature images g22, and the third feature images g23 respectively corresponding to the mixed-color test image and the single-color test image. It is noted that the mixed-color test image and the single-color test image in the present application example are examples of a test image subjected to identification of the singular portions Ps1.

In the present application example, the color-vector identification portion 8e, the periodicity determination portion 8f, and the pattern recognition portion 8g execute the processes for determining the cause of the image defects using the first feature image g21, the second feature image g22, and the third feature image g23 corresponding to the mixed-color test image as in the above-described embodiment.

The periodicity determination portion 8f and the pattern recognition portion 8g in the present application example determines the cause of the image defects corresponding to the singular portions in the mixed-color test image from the plurality of imaging portions 4x respectively corresponding to the plurality of developing colors mixed in the mixed-color test image.

Furthermore, in the present application example, the periodicity determination portion 8f and the pattern recognition portion 8g execute the processes for determining the cause of the image defects using the first feature image g21, the second feature image g22, and the third feature image g23 corresponding to the single-color test image as in the above-described embodiment.

The periodicity determination portion 8f and the pattern recognition portion 8g in the present application example determines the cause of the image defects corresponding to the singular portions in the single-color test image from one of the plurality of imaging portions 4x corresponding to the color of the single-color test image.

The present application example also enables the cause of the image defects to be determined on the basis of fewer test output sheets 9 than the number of all the developing colors of the image forming apparatus 2.

[Fourth Application Example]

The following describes the image-defect determination process in a fourth application example of the image processing apparatus 10.

In the present application example, the CPU 80 determines the cause of singular portions Ps1 by other processes instead of the processes by the pattern recognition portion 8g.

For example, the CPU 80 in the present application example determines the cause of the singular portions Ps1 by classification based on one or a combination of the following: the number of singular portions Ps1 in the first feature image g21, the second feature image g22, or the third feature image g23; the thicknesses or aspect ratios of the singular portions Ps1; and the levels of the pixel values in the singular portions Ps1.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing method performed by a processor for determining an image defect in a test image obtained through an image reading process performed on an output sheet output by an image forming apparatus, the image processing method comprising:
    deriving, by the processor, a vertical data string that is composed of data about horizontal representative values serving as representative values of a plurality of pixel values in each line in a horizontal direction in the test image;
    determining, by the processor, presence or absence of at least one periodicity set in advance in the vertical data string by performing frequency analysis on the vertical data string; and
    determining, by the processor, occurrence or non-occurrence and cause of periodic density unevenness serving as a type of the image defect according to a determination result on the periodicity.

2. The image processing method according to claim 1, wherein
    in a case where the test image is a mixed-color test image synthesized from a plurality of single-color halftone images of different developing colors, the processor performs the deriving the vertical data string, the determining the periodicity, and the determining the cause of the periodic density unevenness on the mixed-color test image for each of predetermined colors respectively corresponding to the developing colors.

3. The image processing method according to claim 1, further comprising:
    determining, by the processor, a singular portion composed of at least one significant pixel in the test image, wherein
    the processor derives the horizontal representative values of pixel values in a portion excluding the singular portion in the test image.

4. The image processing method according to claim 3, wherein
    the determining the singular portion in the test image by the processor includes:
        creating a first preprocessed image by executing a first preprocessing in the horizontal direction of the test image as a processing direction set in advance, the first preprocessing including a main filtering process of converting a pixel value of each pixel of interest sequentially selected from the test image into a converted value obtained by a process of emphasizing difference between pixel values in an area of interest including the pixel of interest and pixel values in two adjacent areas adjoining the area of interest at both sides of the area of interest in the processing direction;
        creating a second preprocessed image by executing a second preprocessing including the main filtering process in a vertical direction of the test image as the processing direction; and
        identifying a portion with a pixel value or a converted value based on the pixel value falling outside a predetermined reference range in each of the first preprocessed image and the second preprocessed image as the singular portion.

5. The image processing method according to claim 4, wherein the first preprocessing includes:
   creating first main map data by executing the main filtering process in the horizontal direction as the processing direction;
   creating horizontal edge-strength map data by executing an edge-enhancement filtering process on each area of interest and one of the two adjacent areas in the test image in the horizontal direction as the processing direction; and
   creating the first preprocessed image by correcting pixel values in the first main map data using corresponding pixel values in the horizontal edge-strength map data, and the second preprocessing includes:
   creating second main map data by executing the main filtering process in the vertical direction as the processing direction;
   creating vertical edge-strength map data by executing the edge-enhancement filtering process on each area of interest and one of the two adjacent areas in the test image in the vertical direction as the processing direction; and
   creating the second preprocessed image by correcting pixel values in the second main map data using corresponding pixel values in the vertical edge-strength map data.

6. An image processing apparatus comprising:
a processor that executes processes of the image processing method according to claim 1.

* * * * *